US011293463B2

(12) United States Patent
Bouman

(10) Patent No.: US 11,293,463 B2
(45) Date of Patent: Apr. 5, 2022

(54) EXTERNALLY VERIFIABLE THERMAL COMPENSATION OF COWL OPENING ACTUATOR

(71) Applicant: Parker-Hannifin Corporation, Cleveland, OH (US)

(72) Inventor: David J. Bouman, Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 484 days.

(21) Appl. No.: 16/519,713

(22) Filed: Jul. 23, 2019

(65) Prior Publication Data

US 2020/0063481 A1 Feb. 27, 2020

Related U.S. Application Data

(60) Provisional application No. 62/720,216, filed on Aug. 21, 2018.

(51) Int. Cl.
*F15B 21/045* (2019.01)
*B64F 5/40* (2017.01)
*B64D 29/08* (2006.01)
*F15B 7/08* (2006.01)
(Continued)

(52) U.S. Cl.
CPC ............ *F15B 21/045* (2013.01); *B64D 29/06* (2013.01); *B64D 29/08* (2013.01); *B64F 5/40* (2017.01); *F15B 7/08* (2013.01); *F15B 15/148* (2013.01)

(58) Field of Classification Search
CPC ...... F15B 21/045; F15B 15/148; B64D 29/06; B64D 29/08
See application file for complete search history.

(56) References Cited

U.S. PATENT DOCUMENTS

| 4,399,966 | A | 8/1983 | Crudden | |
|---|---|---|---|---|
| 4,440,068 | A * | 4/1984 | Tootle | B64D 29/08 92/113 |
| 6,869,046 | B2 | 3/2005 | McEvoy | |

(Continued)

FOREIGN PATENT DOCUMENTS

| EP | 3483455 A1 | 5/2019 |
|---|---|---|
| WO | 2017/216679 | 12/2017 |

OTHER PUBLICATIONS

Search Report for related European Regional Phase Patent Application No. 19189040.9 dated Jan. 29, 2020.

*Primary Examiner* — Philip J Bonzell
*Assistant Examiner* — Ashesh Dangol
(74) *Attorney, Agent, or Firm* — Renner, Otto, Boisselle & Sklar, LLP

(57) ABSTRACT

A cowl door actuator is arranged between a head end and a rod end connected to a cowl door in an aircraft. The cowl door has a closed position and an open position, and the cowl door actuator includes a piston rod that is axially moveable between the head end and the rod end. The piston rod has an extended position in which the piston rod contacts the rod end to move the cowl door to the open position, and a retracted position in which the piston rod is axially spaced from the rod end. When the cowl door is in the closed position, the gap between the piston rod and the rod end enables an axial displacement of the piston rod toward the extended position during thermal expansion of fluid remaining in the actuator, such that the cowl door is maintained in the closed position.

20 Claims, 10 Drawing Sheets

(51) Int. Cl.
 *B64D 29/06* (2006.01)
 *F15B 15/14* (2006.01)

(56) References Cited

U.S. PATENT DOCUMENTS

| | | |
|---|---|---|
| 8,109,467 B2 | 2/2012 | Murphy |
| 2012/0125191 A1* | 5/2012 | Moradell-Casellas ....................... F15B 15/148 92/15 |

* cited by examiner

EXTERNALLY VERIFIABLE THERMAL COMPENSATION OF COWL OPENING ACTUATOR

FIELD OF INVENTION

The present invention relates to jet aircraft engines and, more particularly, to a hydraulic actuator that opens an engine cowl door enabling access to the engine for maintenance before flight of the aircraft.

BACKGROUND

Aircrafts have jet engines that require maintenance and repair work when the aircraft is not in flight. The engine housing typically includes cowl doors that are opened and closed. When the cowl door is opened, a maintenance person, or mechanic, is able to access the interior of the engine housing to perform maintenance or other repairs on the engine. The movement of the cowl door between an open position and a closed position is achieved using an actuator that is connected to the cowl door. The actuator may be operated hydraulically.

Conventional hydraulic actuators have several disadvantages. For example, the actuators require a thermal compensation mechanism that involves a spring or other mechanical device that dynamically pushes oil out of the actuator during closing of the cowl door. The thermal compensation mechanism is traditionally arranged internally within the actuator such that the mechanic is unable to precisely determine when all the fluid is pushed out. Currently, after the cowl door is sufficiently closed, the mechanic waits for a predetermined amount of time before assuming that all of the fluid has been removed from the actuator and the aircraft is ready for flight. However, due to the lack of visual verification, the spring or thermal compensation mechanism may fail and the failure may be undetected before flight of the aircraft, such that an undesirable amount of fluid remains in the actuator. Consequently, during flight, the thermal expansion of the fluid will generate high forces that may open the cowl door.

Additionally, hydraulic actuators implement an accumulator as a thermal compensation mechanism, which is an additional component that must be arranged within the actuator. Thus, the accumulator and the piston rod are separate internal components of the actuator that each require additional sealing within the actuator. Sealing the actuator at multiple locations requires a more complex actuator structure that is also prone to leakage at the multiple sealing locations.

SUMMARY OF INVENTION

The present invention is directed toward an actuator for opening and closing a cowl door of an aircraft. The actuator has a piston rod that is axially moveable between a head end and a rod end that is connected to the cowl door. The piston rod has an extended position in which the piston rod contacts the rod end to move the cowl door to the open position, and a retracted position in which the piston rod is axially spaced from the rod end to form a gap.

When the cowl door is in the closed position, such as during flight of the aircraft, most of the fluid has been displaced out of the actuator, but some fluid will remain. The gap provided between the piston rod and the rod end enables an axial displacement of the piston rod that occurs due to thermal expansion of the remaining fluid. Thus, the piston rod may move toward the extended position without exerting a force on the cowl door that is sufficient to open the cowl door.

Using a portion of the stroke of the piston rod for thermal compensation is advantageous in that the actuator uses one component for both actuation of the cowl door and thermal compensation, eliminating the requirement for both piston rod seals and thermal compensation seals. Thus, the seal count of the actuator is reduced and accordingly, the actuator has fewer locations where leakage may occur.

Additionally, the actuator is also advantageous in that it can provide external verification of fluid displacement out of the actuator when the cowl door is closed. An identifier or visual marker can be formed on an external surface of a plunger of the rod end of the actuator. When a predetermined amount of fluid is displaced out of the actuator, the piston rod will retract back into the actuator and move past the identifier of the plunger, exposing the identifier to outside of the actuator. When the identifier is exposed to the mechanic, the aircraft may be deemed safe for flight.

According to an embodiment of the invention, a cowl door actuator is arranged between a head end and a rod end that is connected to a cowl door. The cowl door is moveable between a closed position and an open position, and the cowl door actuator includes a piston rod that is axially moveable between the head end and the rod end. The piston rod has an extended position in which the piston rod contacts the rod end to move the cowl door to the open position, and a retracted position in which the piston rod is axially spaced from the rod end by a gap. When the cowl door is in the closed position, the gap between the piston rod and the rod end enables an axial displacement of the piston rod toward the extended position during thermal expansion of fluid remaining in the actuator, such that the cowl door is maintained in the closed position when the piston rod is axially displaced.

According to another embodiment of the invention, a method of opening and closing a cowl door in an aircraft includes opening the cowl door by moving a piston rod of an actuator to an extended position in which the piston rod contacts a rod end of the actuator that is connected to the cowl door. The method includes closing the cowl door by displacing fluid out of the actuator and moving the piston rod to a retracted position when the cowl door is in a closed position, whereby a gap is formed between the piston rod and the rod end. The method includes maintaining the cowl door in the closed position using the gap to accommodate for axial displacement of the piston rod during thermal expansion of fluid remaining in the actuator.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

Figure 1:
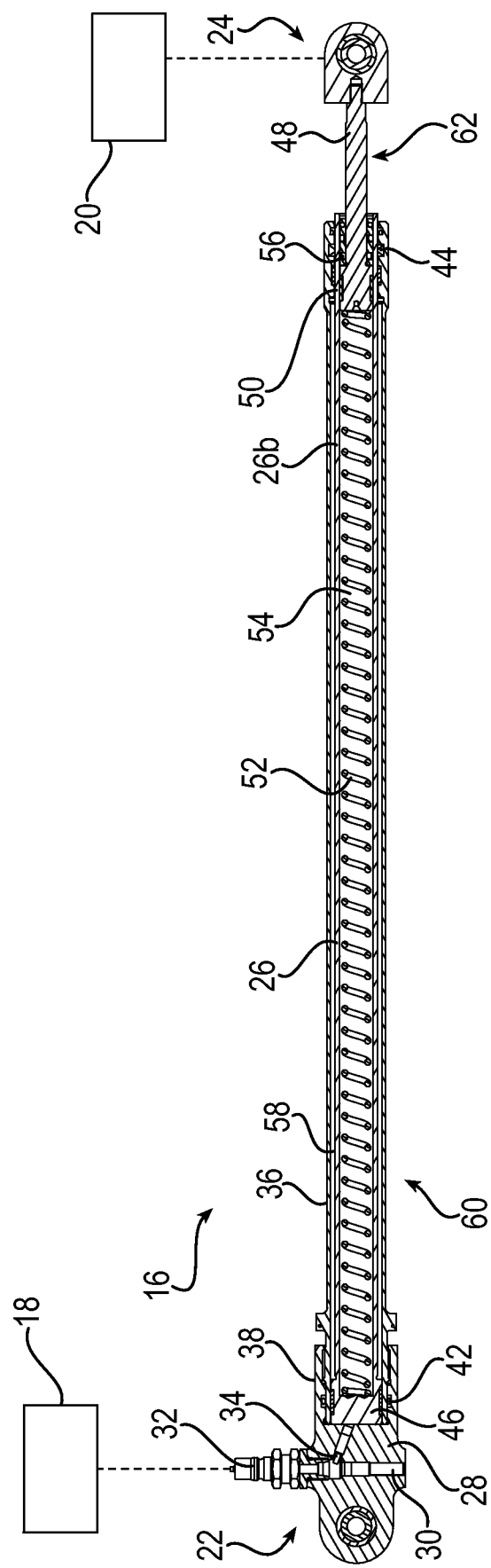
FIG. 1 is a schematic drawing of an actuator for opening and closing a cowl door of an aircraft showing the actuator in an initial unpressurized state before opening the cowl door.
Figure 4:
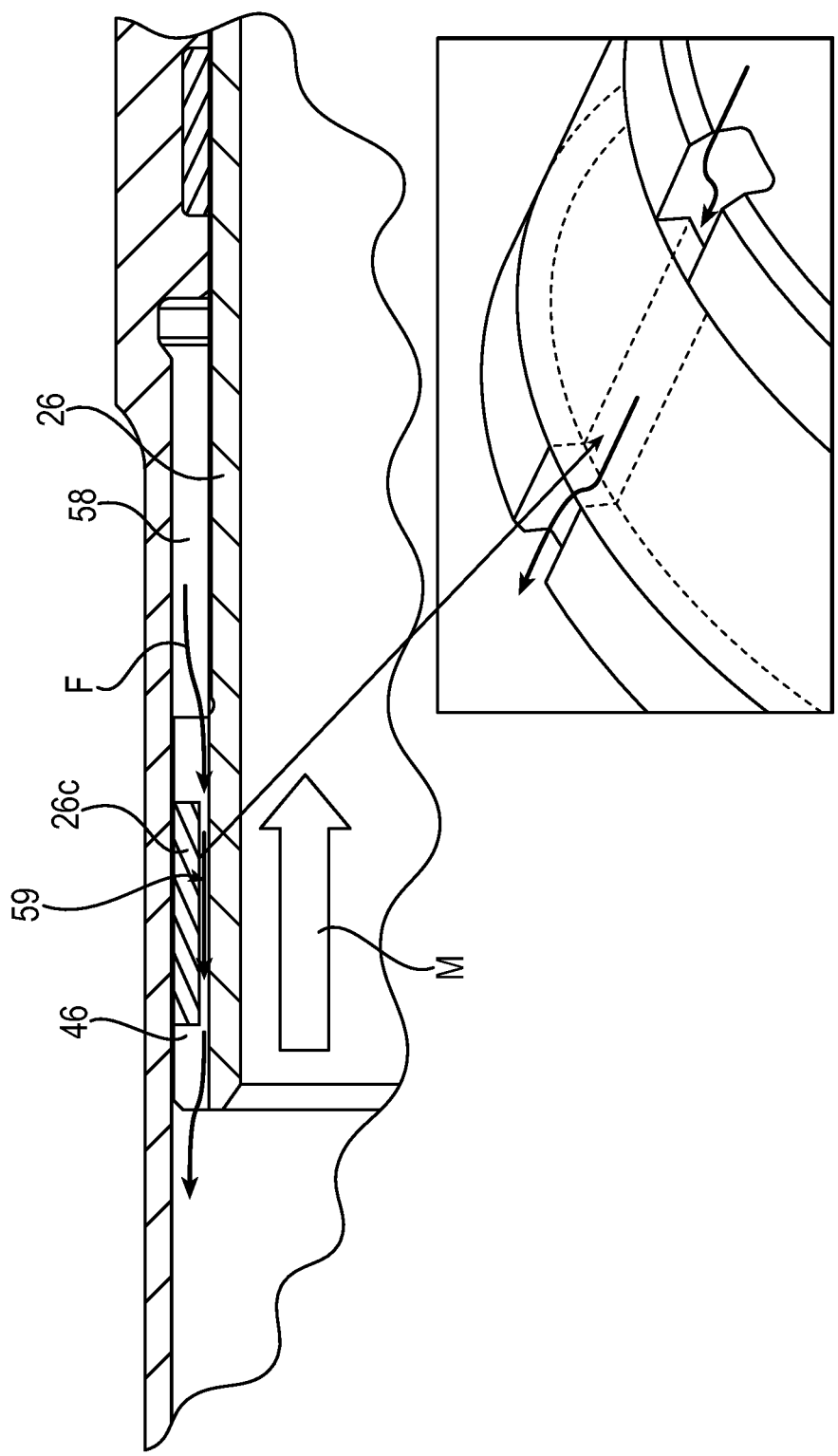
FIG. 4 is a schematic drawing showing a detailed view of fluidly connected piston chambers of the actuator of FIG. 1.
Figure 5:
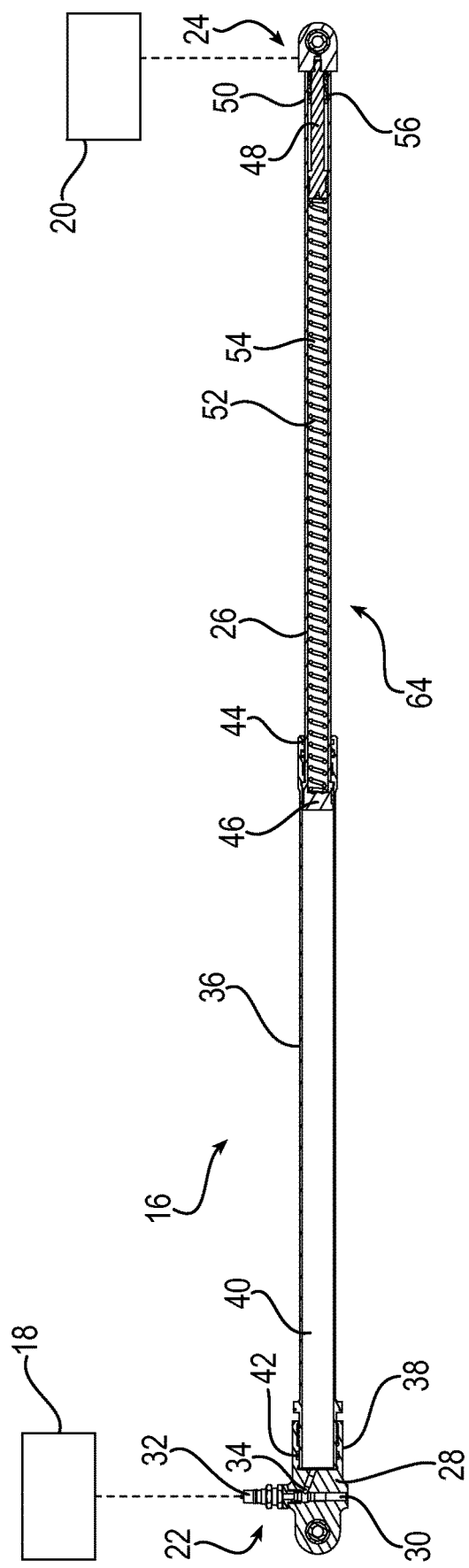
FIG. 5 is a schematic drawing showing the piston rod of the actuator in an extended position when the actuator is in a pressurized state for opening the cowl door.
Figure 10:
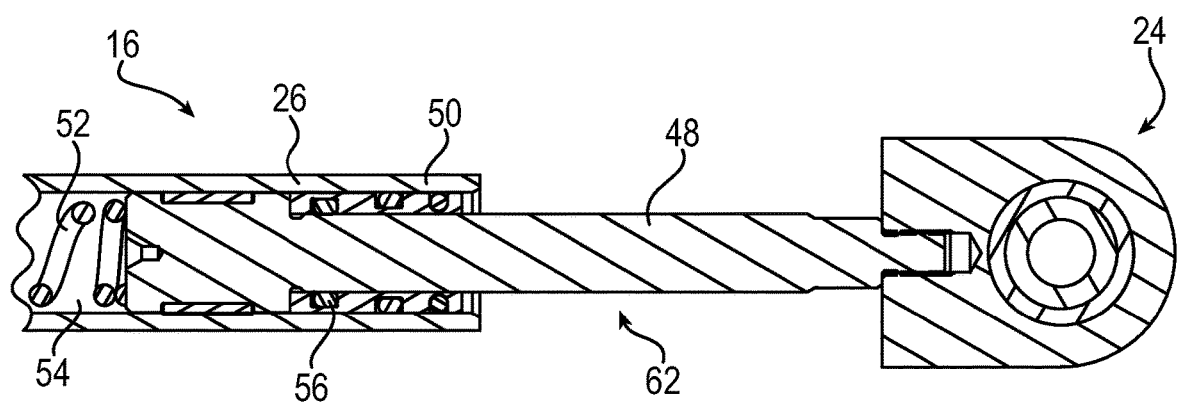
FIG. 10 is a schematic drawing showing a detailed view of the rod end of the actuator of FIG. 8.
Figure 11:
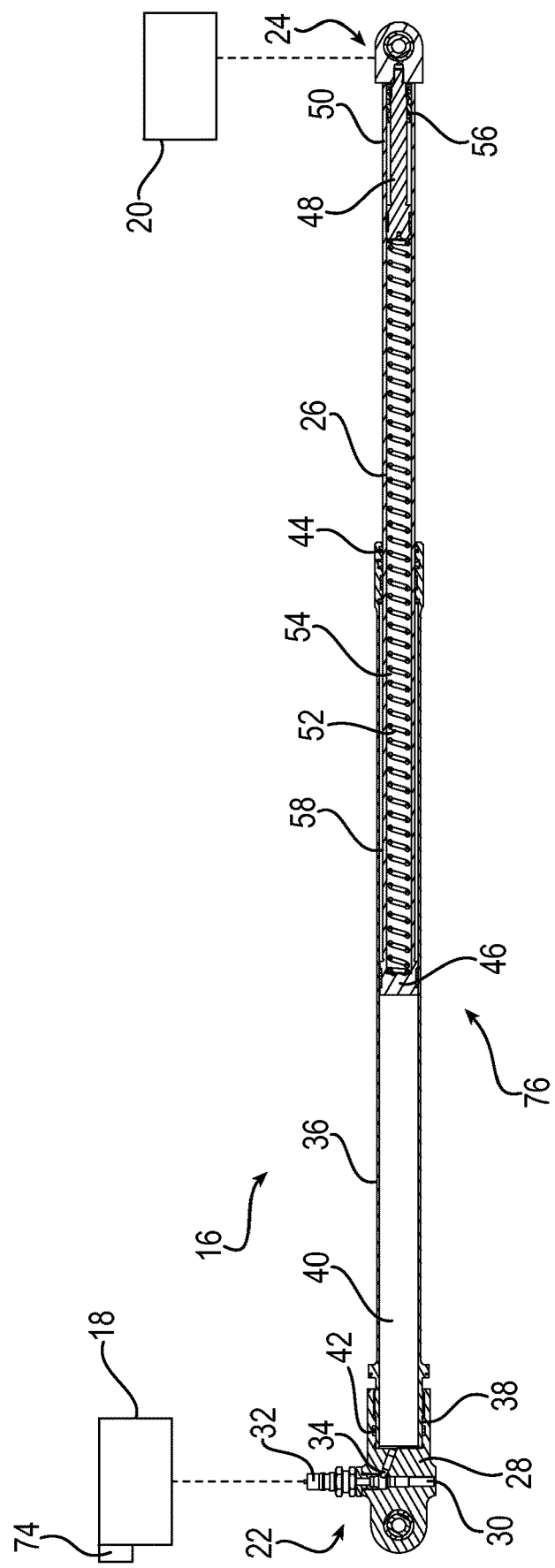
FIG. 11 is a schematic drawing showing the actuator during the initial closing operation for the cowl door.

Aspects of the present invention relate to an actuator for opening and closing a cowl door of an aircraft. The actuator will be described as being hydraulic, but the same principles may be applied to a pneumatic actuator. FIGS. 1-14 show schematic drawings of an actuator 16 according to an embodiment of the present invention. The actuator 16 is connected between a pump 18 and a cowl door 20, as schematically shown in FIGS. 1, 5, and 11. The actuator 16 includes a head end 22 that is connected to the pump 18, a rod end 24 distally opposite the head end 22 and connected to the cowl door 20, and a piston rod 26 that is axially moveable between the head end 22 and the rod end 24 of the actuator 16. The head end 22 includes an actuator housing 28 that has a relief valve 30, a quick connector valve 32, and a flow rate control device or orifice 34 that is in fluid communication with the quick connector valve 32. The quick connector valve 32 may be any suitable fitting or fluid connector for connecting the quick connector valve 32 to a suitable fluid source for the actuator 16, such as the pump 18. Any suitable source of pressurized fluid may be used. In exemplary applications, the pump 18 may be a hand pump.

The actuator 16 further includes a cylinder housing 36 that is secured within an axially protruding end 38 of the actuator housing 28. The cylinder housing 36 extends along the longitudinal axis of the piston rod 26 and defines a first piston chamber 40 in which the piston rod 26 is moveable, as shown in FIGS. 5, 6, 8, 9, and 11. The cylinder housing 36 and the piston rod 26 are cylindrical in shape and the piston rod 26 slides along the cylinder housing 36. The first piston chamber 40 is in fluid communication with the pump 18 through the flow rate control device 34 and the quick connector valve 32 of the actuator housing 28. At least one seal member 42 may be formed in the actuator housing 28 or in the cylinder housing 36 and arranged between the actuator housing 28 and the cylinder housing 36. The seal member 42 is radially arranged around the cylinder housing 36. At least one other seal member 44 may be formed in the cylinder housing 36 and arranged between the cylinder housing 36 and the piston rod 26. The seal member 44 may be arranged in the cylinder housing 36 proximate the rod end 24 of the actuator 16. Any suitable hydraulic seal may be used, such as an o-ring seal, gland-type seal, or gasket-type seal.

Figure 3:
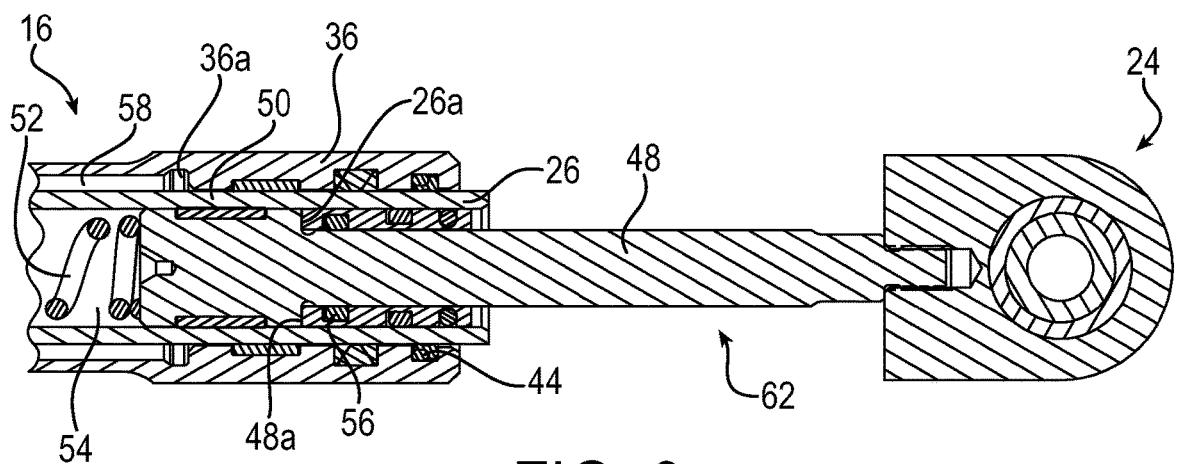
FIG. 3 is a schematic drawing showing a detailed view of a rod end of the actuator of FIG. 1.

The piston rod 26 includes a base end 46 that is proximate the head end 22 of the actuator 16. The piston rod 26 further includes a plunger 48 that is arranged in an opposite end 50 of the piston rod 26 distally opposite the base end 46 and proximate the rod end 24 of the actuator 16. The plunger 48 is secured to the rod end 24 and the rod end 24 is connected to the cowl door 20. The plunger 48 and the base end 46 are arranged along the longitudinal axis of the piston rod 26. The base end 46 of the piston rod 26 slides along the cylinder housing 36 through the first piston chamber 40. The opposite end 50 of the piston rod 26 slides over the plunger 48. The piston rod 26 is axially moveable away from the rod end 24 until a radial surface 26a of the piston rod 26 or end gland inserted into piston rod contacts a radial surface 48a of the plunger 48, as best shown in FIG. 3.

The piston rod 26 further includes an internal biasing member 52 arranged in a longitudinally extending bore 54 of the piston rod 26. The internal biasing member may be a spring 52 that extends along the length of the bore 54 between the base end 46 and the plunger 48 of the piston rod 26. The spring 52 normally biases the piston rod 26 toward the head end 22 of the actuator 16. The piston rod 26 may include at least one seal member 56 formed in the piston rod 26. The seal member 56 contacts an exterior surface of the plunger 48 and is provided to prevent contaminants from entering the bore 54 of the piston rod 26.

The actuator 16 may include a second piston chamber 58 that is longitudinally adjacent to the first piston chamber 40 and has unrestricted fluid communication with the first piston chamber 40. The second piston chamber 58 is arranged outside the piston rod 26 and defined between the piston rod 26 and the cylinder housing 36. The piston rod 26 includes a longitudinally extending body 26b that extends from the base end 46 and over the plunger 48 toward the rod end 24, as best shown in FIG. 1. The second piston chamber 58 is radially interposed between the longitudinally extending body 26b and the cylinder housing 36. The second piston chamber 58 extends axially between the base end 46 and a radial surface 36a of the cylinder housing 36, as best shown in FIG. 3.

The first piston chamber 40 and the second piston chamber 58 are in fluid communication for fluid displacement within the actuator 16. When the cowl door 20 is held in an open position, fluid is displaced from the first piston chamber 40 into the second piston chamber 58 when the piston rod 26 axially moves from the rod end 24 toward the head end 22. As shown in FIG. 4, the base end 46 of the piston rod 26 includes at least one wear ring 26c. Cuts 59 are formed in the piston rod 26 under the wear ring 26c to enable fluid flow F under the wear ring 26c between the first piston chamber 40 and the second piston chamber 58. The fluid flow F along the cut 59 is in an axial direction opposite to the direction of the movement M of the piston rod 26. Any suitable number of cuts 59 may be formed. For example, four cuts may be suitable and the cuts are sized to reduce fluid resistance while providing support to the wear ring 26c.

When the actuator 16 is initially pressurized to open the cowl door 20, the first piston chamber 40 is filled with hydraulic fluid and the base end 46 of the piston rod 26 moves toward the rod end 24 until the base end 46 engages the radial surface 36*a* of the cylinder housing 36. Accordingly, the volume of the second piston chamber 58 decreases as the volume of the first piston chamber 40 is filled with hydraulic fluid, as best shown in FIG. 5. After the cowl door 20 is being held in the open position, the actuator 16 is depressurized, and the spring 52 will push the piston rod 26 toward the head end 22 and the retracted position such that fluid will be displaced from the first piston chamber 40 into the second piston chamber 58 in addition to exiting the actuator via the orifice 34 and the quick connector valve 32. Accordingly, as the piston rod 26 moves closer to the head end 22, the second piston chamber 58 is filled with fluid from the first piston chamber 40 and the volume of the second piston chamber 58 increases.

Figure 2:
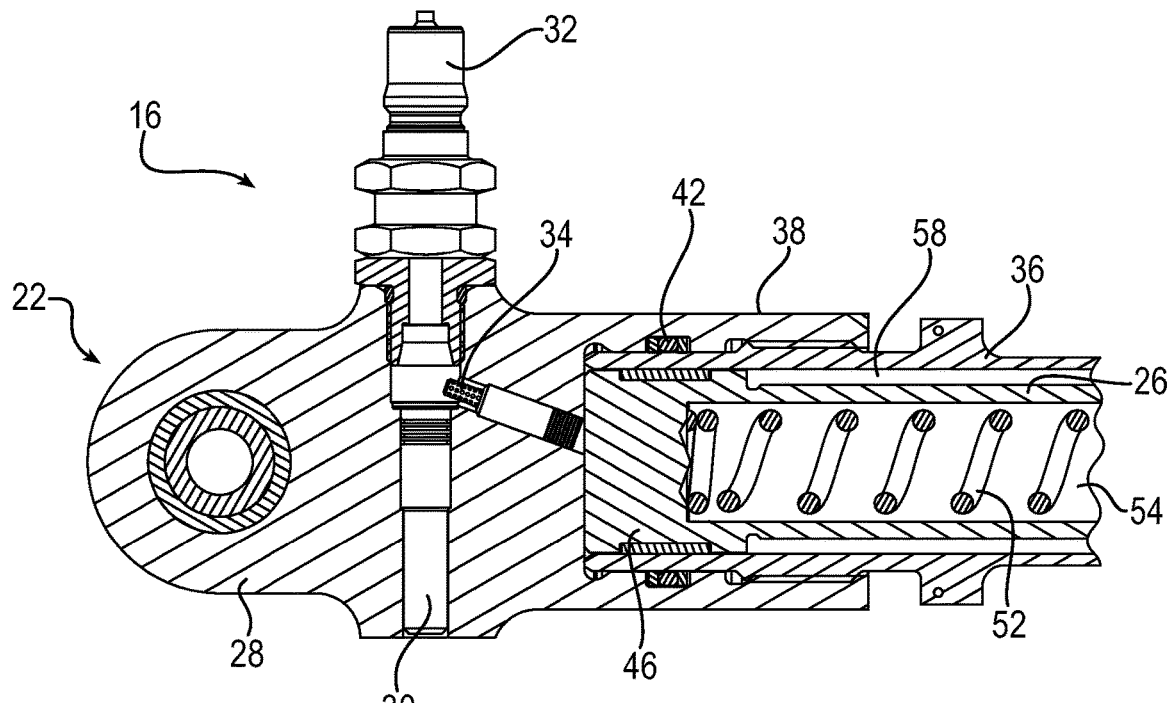
FIG. 2 is a schematic drawing showing a detailed view of a head end of the actuator of FIG. 1.

An opening and closing cycle of the cowl door 24 using the actuator 16 will now be described. Referring first to FIGS. 1-3, the piston rod 26 is shown in an initial position 60 in which the actuator 16 is unpressurized and the piston rod 26 is biased by the internal spring 52 toward the head end 22 and the actuator housing 28. The base end 46 of the piston rod 26 is engageable against the actuator housing 28 such that the first piston chamber 40 is filled by the piston rod 26. When in the initial position 60, a gap 62 is formed between the opposite end 50 of the piston rod 26 and the rod end 24 that is connected to the cowl door 20. The cowl door 20 is initially in the closed position, such as during flight of the aircraft or prior to maintenance. As will be described further below, the gap 62 between the piston rod 26 and the rod end 24 provides for an axial displacement of the piston rod 26 that may occur due to the thermal expansion of remaining fluid in the actuator 16 when the cowl door is closed. Using the gap 62 to accommodate movement of the piston rod 26 enables the piston rod 26 to move without exerting a force on the cowl door 20 that could cause the cowl door 20 to open during flight of the aircraft.

Figure 6:
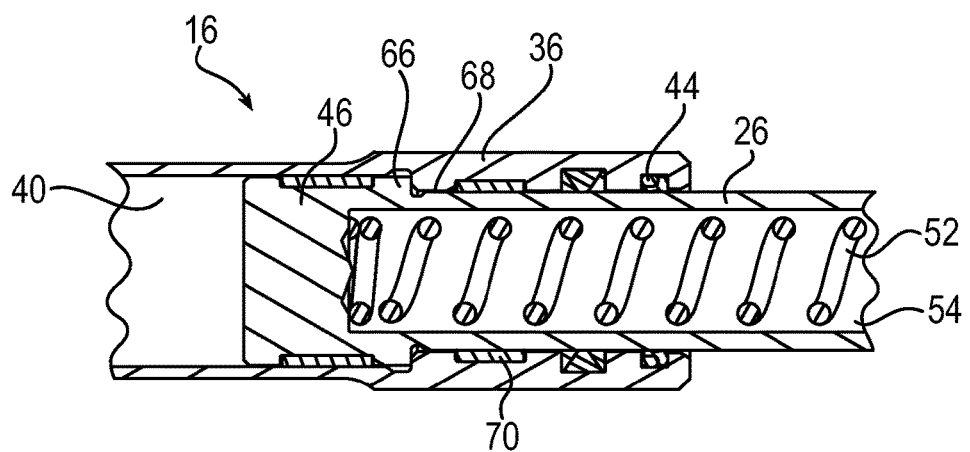
FIG. 6 is a schematic drawing showing a detailed view of the piston rod of the actuator of FIG. 5.
Figure 7:
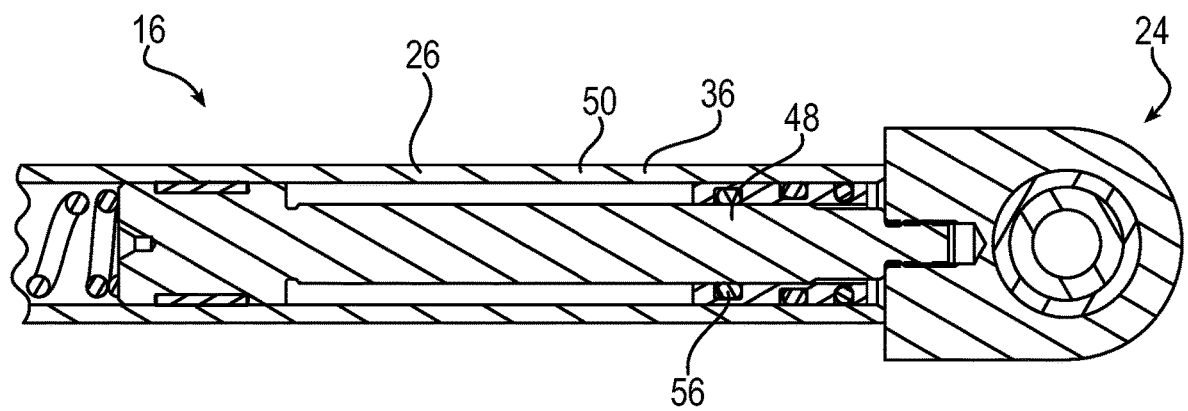
FIG. 7 is a schematic drawing showing a detailed view of the rod end of the actuator of FIG. 5.

Moving the cowl door 20 from the closed position to the open position is achieved by forcing fluid into the actuator 16. Referring now to FIGS. 5-7, the piston rod 26 is shown in an extended position 64 in which the actuator 16 is pressurized to move the cowl door 20 to the open position. The actuator 16 is pressurized by operation of the pump 18. The pump 18 may be ground-supported and remotely located from the actuator 16. The pump 18 is fluidly connected to the quick connector valve 32 by a hose or other suitable fluid connector. When the pump 18 is operated, pressurized hydraulic fluid, such as oil, is directed into the piston chambers 40, 58 of the actuator 16 through the quick connector valve 32 and the flow rate control device 34 that is in fluid communication with the quick connector valve and the first piston chamber 40. As the first piston chamber 40 is filled with pressurized fluid, the biasing force of the internal spring 52 is overcome and the piston rod 26 moves through the first piston chamber 40 defined by the cylinder housing 36 and along the cylinder housing 36 toward the rod end 24 of the actuator 16.

The output force on the cowl door 20 from the pressurized actuator 16 is initially minimal and movement of the cowl door 20 does not occur until the opposite end 50 of the piston rod 26 moves to contact the rod end 24 and the gap 62 between the piston rod 26 and the rod end 24 is eliminated. Thus, any additional pressurized fluid that is pumped into the actuator 16 will cause the cowl door 20 to move due to the contact between the piston rod 26 and the rod end 24. When reaching and in the fully extended position 64, the piston rod 26 bears the load of the cowl door 20 to hold the cowl door 20 in the open position.

As best shown in FIG. 5, the piston rod 26 will stop extending when a stop shoulder 66 formed proximate the base end 46 of the piston rod 26 axially abuts against a corresponding stop shoulder 68 formed on the cylinder housing 36. The stop elements 66, 68 may have any suitable shape and are arranged at an axial position along the actuator 16. The axial position is the predetermined position at which the stop will contact each other to prevent further axial movement of the piston rod 26. The stop shoulder 68 of the cylinder housing 36 may extend radially inwardly from the cylinder housing 36 and a plurality of gasket-type seal members 70 may be formed on opposite sides of the contacting stop elements 66, 68. Accordingly, when the stop elements 66, 68 are in contact with each other, the actuator 16 is fully extended and load bearing. Once the actuator 16 is in the fully extended position 64, if additional fluid is supplied into the actuator 16, the relief valve 30 of the pump housing 28 may be opened to vent excess pressure in the actuator 16. The pump 18 may also include a relief valve for releasing excess pressure.

Figure 8:
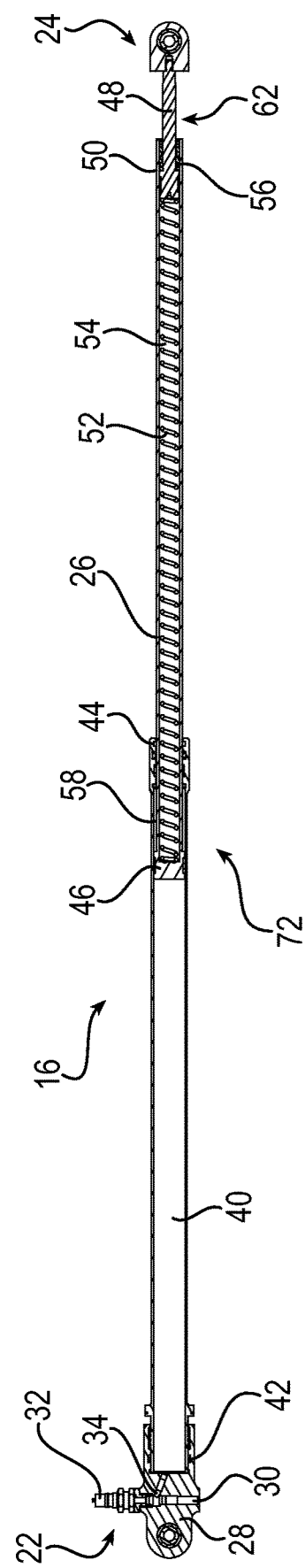
FIG. 8 is a schematic drawing showing the piston rod in a partially retracted position when the actuator is in an unpressurized state while the cowl door is open.
Figure 9:
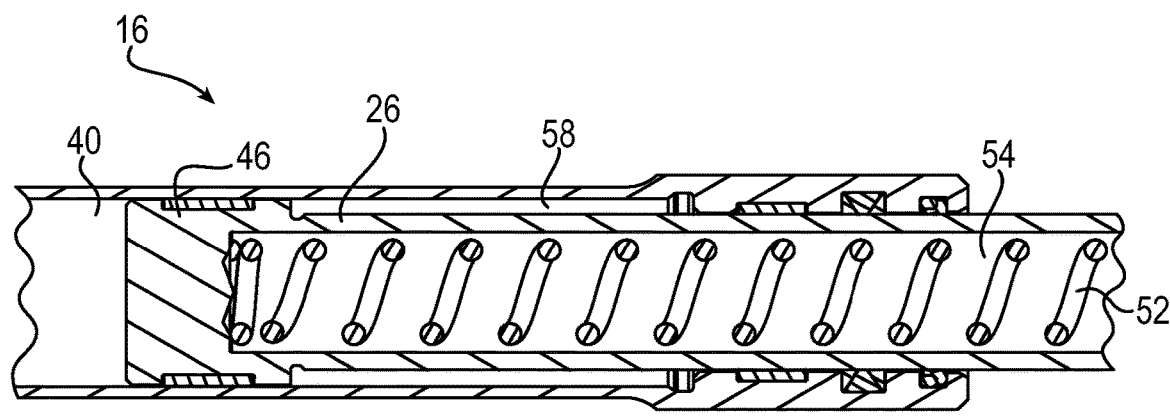
FIG. 9 is a schematic drawing showing a detailed view of the piston rod of the actuator of FIG. 8.

After the actuator 16 has reached the fully extended position 64, and the cowl door 20 is fully opened, the cowl door 20 may be held in the opened position by another mechanism so that the actuator 16 may be depressurized. For example, the mechanic may implement a mechanical device, such as a secondary hold open rod, for holding the cowl door 20 in the open position while the mechanic performs maintenance or repairs on the engine. When the rod is in place and the cowl door 20 is held open, the pressure in the actuator 16 is reduced to enable the rod to support the weight of the cowl door 20, such that the piston rod 26 no longer bears the load of the cowl door 20. The cowl door 20 will start to move toward the closed position to adjust to the position of the rod. After the cowl door 20 stops closing due to the support of the mechanical rod, the rod end 24 stops moving and the piston rod 26 continues to move toward the head end 22. The piston rod 26 retracts into the actuator 16 to move toward a retracted position 72 in which the piston rod 26 is non-load bearing, as shown in FIGS. 8-10.

As the piston rod 26 moves toward the head end 22 of the actuator 16 and the retracted position 72, the fluid volume is displaced from the first piston chamber 40 with some fluid entering the second piston chamber 58. When the piston rod 26 is in the retracted position 72, the gap 62 is again formed between the opposite end 50 of the piston rod 50 and the rod end 24. After the piston rod 26 has reached the retracted position 72 or any point in-between, the pump 18 is disconnected from the quick connector valve 32 and the actuator 16 is unpressurized. The cowl door 20 remains in the open position and the piston rod 26 is in an extended position but non-load bearing position. Holding the piston rod 26 in the retracted position 72 enables the piston rod 26 to be proximate the rod end 24 such that the actuator 16 is able to quickly assume the load of the cowl door 20 during sudden failure of the rod that is holding the cowl door 20 in the open position.

During the initial closing operation of the cowl door 20, the actuator 16 will re-assume the load of the cowl door 20. The pump 18 is reconnected to the quick connector valve 32 and fluid is again supplied into the actuator 16 through the actuator housing 38. The fluid from the second piston chamber 58 is displaced back into the first piston chamber 40 such that the volume of the second piston chamber 58 decreases. The gap 62 between the opposite end 50 of the piston rod 26 and the rod end 24 is also eliminated and the piston rod 26 moves back toward the extended position 64 in which the piston rod 26 contacts the rod end 24, as shown in FIGS. 5-7. After the gap 62 is fully eliminated and the piston rod 26 is in the fully extended position and again bearing the load of the cowl door 20, the rod holding the cowl door 20 open may be removed.

Referring now to FIG. 11, after the rod has been removed, the cowl door 20 is lowered toward the closed position. Pressure is vented out of the actuator 16 by way of a dump valve 74 arranged on the pump 18. The flow rate control device 34 in the actuator housing 28 enables a metered flow of fluid out of the actuator 16 such that the cowl door 20 will close at a controlled rate regardless of the amount of opening of the dump valve 74. The weight of the cowl door 20 and the force of the spring 52 will gradually force fluid out of the actuator 16. The piston rod 26 will move to a partially extended position 76 in which the piston rod 26 still bears the load of the cowl door 20. In the partially extended position 76, the gap between the opposite end 50 of the piston rod 26 and the rod end 24 is still eliminated. The second piston chamber 58 will increase in volume as the piston rod 26 moves toward the head end 22.

After the cowl door 20 has stopped in an initial closed position, the piston rod 26 will continue to retract toward the head end 22 and into the actuator 16 by way of the spring force of the internal spring 52. Accordingly, the piston rod 26 will continue to displace fluid out of the actuator 16. Displacing the fluid out of the actuator 16 enables a volume within the actuator 16 to be filled by the remaining fluid that may thermally expand. For example, during flight of the aircraft in which the cowl door 20 is arranged, fluid that remains in the actuator 16 routinely changes temperature and expands. Accommodating for the fluid expansion within the actuator 16 ensures that the expanded fluid has space in which to expand such that the force of the expanded fluid cannot force the cowl door 20 into the open position during flight.

Figure 12:
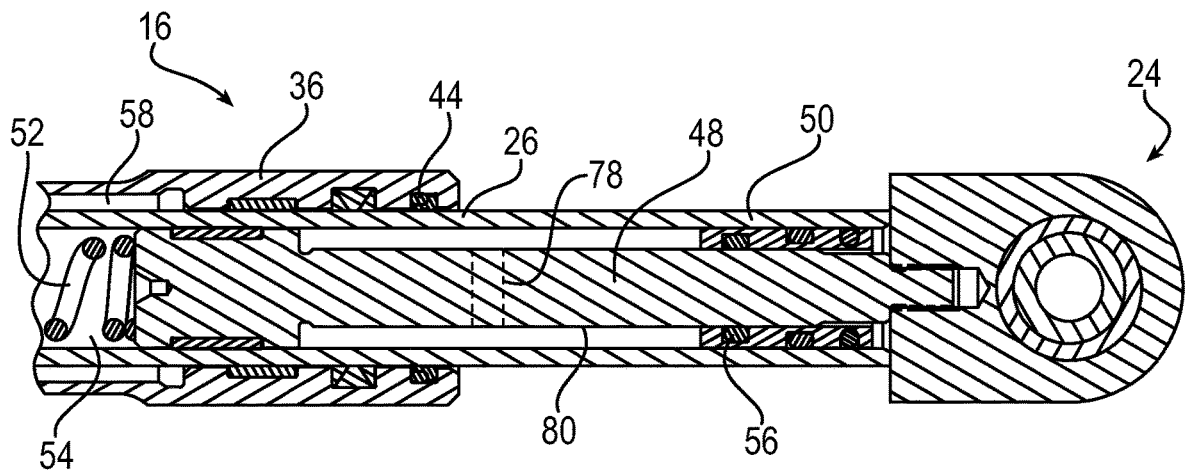
FIG. 12 is a schematic drawing showing an externally verifiable indicator of the actuator when the piston rod is in the extended position.
Figure 13:
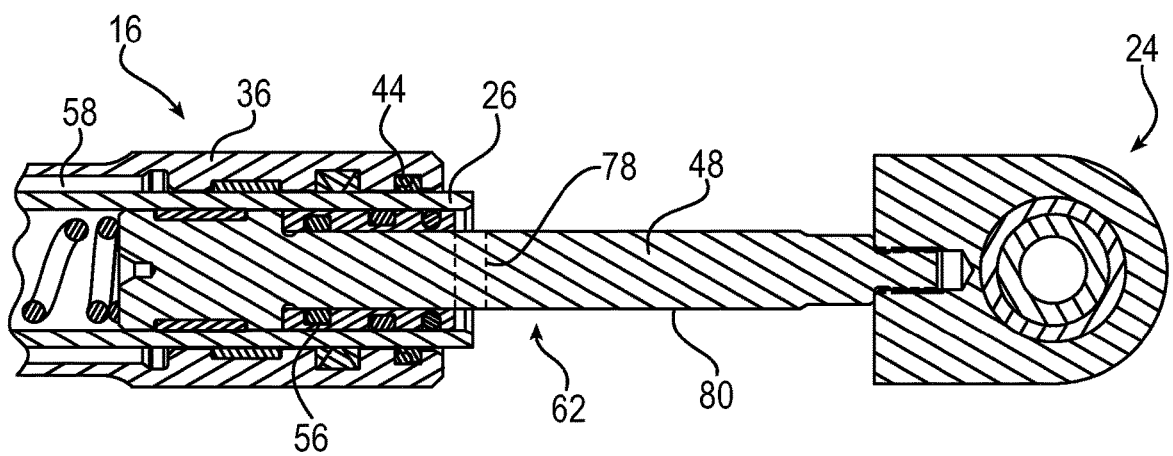
FIG. 13 is a schematic drawing showing the externally verifiable indicator of the actuator when the cowl door is being closed and fluid is being displaced from the actuator.

Referring now to FIGS. 12 and 13, after the piston rod 26 has moved to the fully retracted position, which is also shown as the initial position 60 of the piston rod 26 in FIG. 1, an indicator 78 formed on an exterior surface of 80 the plunger 48 will be exposed to outside the actuator 16. The indicator 78 is advantageously visible to the mechanic. As shown in FIG. 12, when the piston rod 26 is fully extended and contacting the rod end 24, the indicator 78 is covered by the piston rod 26 such that the indicator 78 is not exposed or externally verifiable. As shown in FIG. 13, as the piston rod 26 retracts toward the head end 22 and into the actuator 16 along the plunger 48, the gap 62 is formed between the piston rod 26 and the rod end 24, and the indicator 78 on the plunger 48 is exposed. The indicator 78 may be any suitable physical marking such as a band that extends around the circumference of the plunger 48. In other embodiments, the indicator 78 may be configured to be automatically detectable by a sensor, such as a light sensor.

Figure 14:
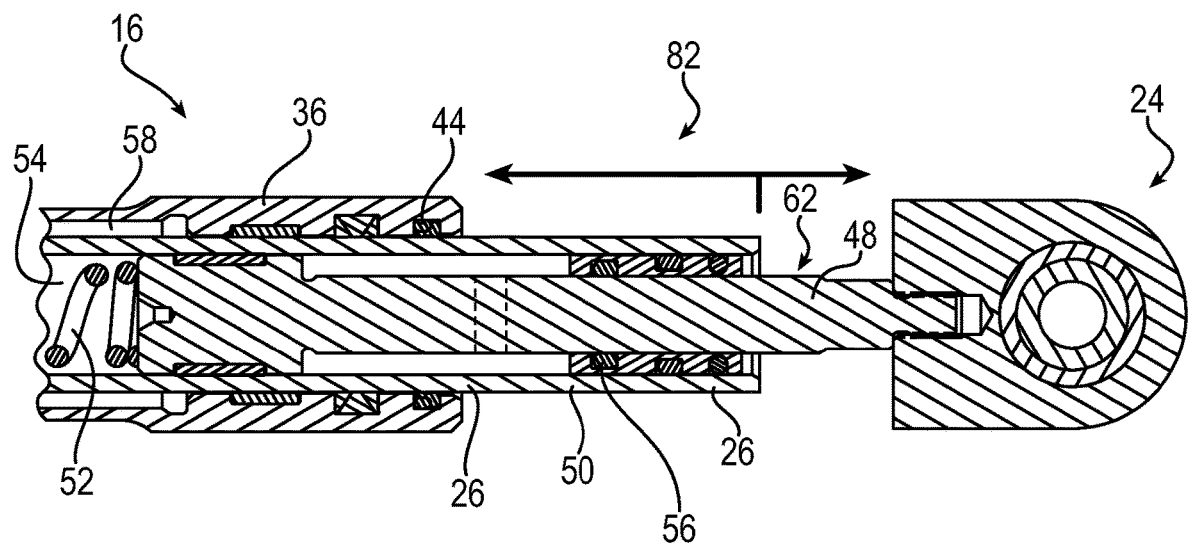
FIG. 14 is a schematic drawing showing a compensating stroke of the piston rod that is reserved for movement of the actuator as a result of thermal expansion during flight of the aircraft.

After the indicator 78 is exposed and externally verifiable, the pump 18 is disconnected from the quick connector valve 32 and the aircraft in which the actuator 16 is arranged may be deemed suitable for flight. With further reference to FIG. 14, the actuator 16 is configured such that the piston rod 26 is able to have further axial movement after the actuator 16 is pressurized. The piston rod 26 is arranged within the actuator 16 to have a predetermined stroke 82, or a distance within the actuator 16 that the piston rod 26 can move without causing any movement of the cowl door 20. The predetermined stroke 82 has a first length that accommodates for movement of the rod end 24 due to force occurring on the actuator 16 when a closing mechanism of the cowl door 20 is engaged to pull the cowl door 20 into a fully closed position. For example, latches of the cowl door 20 may be used to further secure the cowl door 20 and provide a slight pressure on the actuator 16.

A second length of the predetermined stroke 82 is adjacent the first length and accommodates for thermal expansion of the fluid that remains in the actuator 16 during flight of the aircraft. This length corresponds to the gap 62 and the length will correspond to the amount of thermal compensation that is accommodated. During flight, the volume of the fluid remaining in the actuator will increase due to the changes in ambient temperature. The expansion of the fluid will force the piston rod 26 toward the rod end 24 and the extended position. However, the internal spring 52 of the piston rod 26 will counteract the expansion of the fluid, such that the output force of the expanded fluid will not exceed a predetermined force that would open the cowl door 20 during flight. The predetermined stroke 82 of the piston rod 26 in the gap 62 enables an axial displacement of the piston rod 26. By enabling an axial displacement of the piston rod 26, the piston rod 26 can move without exerting a force on the cowl door 20 that would cause the cowl door 20 to open during flight. Thus, providing a stroke of the piston for thermal compensation enables maintaining the cowl door 20 in the closed position.

The cowl door actuator as described herein provides several advantages over conventional cowl door actuators. In contrast to the conventional actuators that provided the thermal expansion compensation mechanism, or accumulator, internally within the actuator, the thermal compensation mechanism of the present application uses the stroke of the piston rod such that both the actuation of the cowl door and the thermal compensation are achieved using the piston rod. Thus, fewer hydraulic seals are used in the actuator, enabling less complex manufacturing and fewer potential leakage areas. Additionally, the present actuator enables external verification that the fluid has been emptied from the actuator. Accordingly, the remaining fluid in the actuator is minimal and thermal expansion of the fluid during flight will not provide a force that is great enough to open the cowl door.

A cowl door actuator is arranged between a head end and a rod end that is connected to a cowl door. The cowl door is moveable between a closed position and an open position, and the cowl door actuator includes a piston rod axially moveable between the head end and the rod end. The piston rod has an extended position in which the piston rod contacts the rod end to move the cowl door to the open position, and a retracted position in which the piston rod is axially spaced from the rod end by a gap. When the cowl door is in the closed position, the gap between the piston rod and the rod end enables an axial displacement of the piston rod toward the extended position during thermal expansion of fluid remaining in the actuator, such that the cowl door is maintained in the closed position when the piston rod is axially displaced.

The cowl door actuator may include a first piston chamber and a second piston chamber that are in fluid communication with each other along a longitudinal axis of the piston rod The piston rod is moveable to the retracted position when the cowl door is in the open position by displacement of fluid from the first piston chamber into the second piston chamber while also allowing fluid to exit the actuator via the orifice and quick disconnect. The piston rod is moveable to the retracted position when the cowl door is in the closed position by displacement of fluid out of the actuator.

The piston rod includes a base end proximate the head end, and the first piston chamber is adjacent the base end.

The cowl door actuator includes a cylinder housing surrounding the piston rod, and the piston rod has a longitudinally extending body that extends from the base end toward the rod end. The longitudinally extending body has an outer diameter that is smaller than an outer diameter of the base end, and the second piston chamber is radially interposed between the longitudinally extending body and the cylinder housing.

The cylinder housing has at least one seal that is formed in the cylinder housing and contacts the longitudinally extending body of the piston rod.

At least one seal is formed in the base end and radially interposed between the cylinder housing and the piston rod.

The piston rod includes a plunger connected to the rod end, an internal bore that axially extends between the base end of the piston rod and the plunger, and a biasing member arranged in the internal bore.

The biasing member is a spring that normally biases the piston rod toward the head end.

The plunger includes an indicator formed on an exterior surface of the plunger, and the piston rod is moveable past the indicator exposing the indicator to outside the actuator when fluid is displaced out of the actuator and the cowl door is in the closed position.

The piston rod includes at least one seal that is formed inside the piston rod and contacts the exterior surface of the plunger.

The cowl door actuator includes a wear ring arranged around the piston rod and a cut formed in the piston rod radially between the piston rod and the wear ring. The cut is fluidly connected between the first piston chamber and the second piston chamber for fluid communication therebetween.

The cowl door actuator includes an actuator housing arranged at the head end.

The actuator housing includes a relief valve that vents excess pressure when the piston rod is in the extended position.

The actuator housing includes a quick connector valve that is connectable to a pump, and the quick connector valve is configured to engage the pump when the actuator is pressurized and disengage the pump when the actuator is unpressurized.

The actuator housing includes a flow rate control device in fluid communication with the quick connector valve.

The actuator housing includes at least one seal formed therein.

A method of opening and closing a cowl door in an aircraft includes opening the cowl door by moving a piston rod of an actuator to an extended position in which the piston rod contacts a rod end of the actuator that is connected to the cowl door, closing the cowl door by displacing fluid out of the actuator, moving the piston rod to a retracted position when the cowl door is in a closed position, whereby a gap is formed between the piston rod and the rod end, and maintaining the cowl door in the closed position using the gap to accommodate for axial displacement of the piston rod during thermal expansion of fluid remaining in the actuator.

The method includes holding the cowl door in an open position and moving the piston rod to the retracted position when the cowl door is in the open position by displacing fluid within the actuator.

The method includes displacing fluid from a first piston chamber to a second piston chamber arranged along a longitudinal axis of the piston rod.

The method includes disconnecting a source of pressurized fluid from the actuator when the piston rod is in the retracted position.

The method includes opening the cowl door by further pressurizing the actuator after the gap is eliminated.

The method includes pressurizing the actuator by supplying a fluid from a fluid source to the actuator and depressurizing the actuator after the cowl door is in an open position and the piston rod is moved to the retracted position.

The method includes closing the cowl door by re-pressurizing the actuator before depressurizing the actuator.

The method includes venting excess pressure out of the actuator when the piston rod is in the extended position and the actuator is pressurized.

The method includes using a mechanical rod to hold the cowl door in the open position when the actuator is depressurized.

The method includes using a biasing member to continue moving the piston rod away from the rod end after the cowl door is in an initial closed position, whereby fluid is displaced out of the actuator, and then disconnecting the fluid source from the actuator.

The method includes using the biasing member to counteract a force of the thermal expansion, whereby the cowl door is maintained in a fully closed position.

The method includes moving the piston rod along a plunger connected to the rod end until an indicator formed on an exterior surface of the plunger is exposed to outside the actuator.

The method includes disconnecting the fluid source from the actuator when the indicator is exposed.

The method includes using a flow rate control device to control fluid displacement out of the actuator.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A cowl door actuator arranged between a head end and a rod end that is connected to a cowl door, the cowl door being moveable between a closed position and an open position, the cowl door actuator comprising a piston rod axially moveable between the head end and the rod end, the piston rod having an extended position in which the piston rod contacts the rod end to move the cowl door to the open position, and a retracted position in which the piston rod is axially spaced from the rod end by a gap, wherein when the cowl door is in the closed position, the gap between the piston rod and the rod end enables an axial displacement of the piston rod toward the extended position during thermal expansion of fluid remaining in the actuator, whereby the cowl door is maintained in the closed position when the piston rod is axially displaced.

2. The cowl door actuator according to claim 1 further comprising a first piston chamber and a second piston chamber that are in fluid communication with each other along a longitudinal axis of the piston rod.

3. The cowl door actuator according to claim 2, wherein the piston rod is moveable to the retracted position when the cowl door is in the open position by displacement of fluid from the first piston chamber into the second piston chamber and exiting the actuator, wherein the piston rod is moveable to the retracted position when the cowl door is in the closed position by continued displacement of fluid out of the actuator.

4. The cowl door actuator according to claim 2 or 3, wherein the piston rod includes a base end proximate the head end, the first piston chamber being adjacent the base end.

5. The cowl door actuator according to claim 4 further comprising a cylinder housing surrounding the piston rod, wherein the piston rod has a longitudinally extending body that extends from the base end toward the rod end, the longitudinally extending body having an outer diameter that is smaller than an outer diameter of the base end, wherein the second piston chamber is radially interposed between the longitudinally extending body and the cylinder housing.

6. The cowl door actuator according to claim 5, wherein the cylinder housing has at least one seal that is formed in the cylinder housing and contacts the longitudinally extending body of the piston rod.

7. The cowl door actuator according to claim 5 further comprising at least one seal formed in the base end and radially interposed between the cylinder housing and the piston rod.

8. The cowl door actuator according to claim 4, wherein the piston rod includes a plunger connected to the rod end, an internal bore that axially extends between the base end of the piston rod and the plunger, and a biasing member arranged in the internal bore.

9. The cowl door actuator according to claim 8, wherein the biasing member is a spring that normally biases the piston rod toward the head end.

10. The cowl door actuator according to claim 8, wherein the plunger includes an indicator formed on an exterior surface of the plunger, and wherein the piston rod is moveable past the indicator exposing the indicator to outside the actuator when fluid is displaced out of the actuator and the cowl door is in the closed position.

11. The cowl door actuator according to claim 10, wherein the piston rod includes at least one seal that is formed inside the piston rod and contacts the exterior surface of the plunger.

12. The cowl door actuator according to claim 2 further comprising a wear ring arranged around the piston rod and a cut formed in the piston rod radially between the piston rod and the wear ring, wherein the cut is fluidly connected between the first piston chamber and the second piston chamber for fluid communication therebetween.

13. The cowl door actuator according to claim 1 further comprising an actuator housing arranged at the head end.

14. The cowl door actuator according to claim 13, wherein the actuator housing includes a relief valve that vents excess pressure when the piston rod is in the extended position.

15. The cowl door actuator according to claim 13, wherein the actuator housing includes a quick connector valve that is connectable to a pump, wherein the quick connector valve is configured to engage the pump when the actuator is pressurized and disengage the pump when the actuator is unpressurized.

16. The cowl door actuator according to claim 15, wherein the actuator housing includes a flow rate control device in fluid communication with the quick connector valve.

17. The cowl door actuator according to claim 13, wherein the actuator housing includes a seal formed therein.

18. A method of opening and closing a cowl door in an aircraft, the method comprising:
opening the cowl door by moving a piston rod of an actuator to an extended position in which the piston rod contacts a rod end of the actuator that is connected to the cowl door;
closing the cowl door by displacing fluid out of the actuator;
moving the piston rod to a retracted position when the cowl door is in a closed position, whereby a gap is formed between the piston rod and the rod end; and
maintaining the cowl door in the closed position using the gap to accommodate for axial displacement of the piston rod during thermal expansion of fluid remaining in the actuator.

19. The method according to claim 18 further comprising:
holding the cowl door in an open position; and
moving the piston rod to the retracted position when the cowl door is in the open position by displacing fluid within the actuator.

20. The method according to claim 19 further comprising:
displacing fluid from a first piston chamber to a second piston chamber arranged along a longitudinal axis of the piston rod;
disconnecting a source of pressurized fluid from the actuator when the piston rod is in the retracted position; and
opening the cowl door by further pressurizing the actuator after the gap is eliminated.

* * * * *